United States Patent

Tsao

[11] 4,074,660
[45] Feb. 21, 1978

[54] WASTE HEAT RECOVERY FROM HIGH TEMPERATURE REACTION EFFLUENTS

[75] Inventor: Utah Tsao, Jersey City, N.J.

[73] Assignee: The Lummus Company, Bloomfield, N.J.

[21] Appl. No.: 634,409

[22] Filed: Nov. 24, 1975

[51] Int. Cl.² ............................................. F22B 1/02
[52] U.S. Cl. ...................................... 122/32; 122/34; 165/39; 165/158; 165/161
[58] Field of Search .................... 122/32, 34; 165/161, 165/158, 39

[56] References Cited

U.S. PATENT DOCUMENTS

| | | | |
|---|---|---|---|
| 3,177,659 | 4/1965 | Berman | 122/32 |
| 3,238,729 | 3/1966 | Frankel | 165/161 |
| 3,376,917 | 4/1968 | Fristoe | 165/39 |
| 3,483,848 | 12/1969 | Green | 122/32 |
| 3,547,084 | 12/1970 | Sprague | 122/32 |
| 3,734,176 | 5/1973 | Hagnauer | 165/158 |
| 3,766,892 | 10/1973 | Webster | 122/32 |
| 3,896,770 | 7/1975 | Byerley | 122/34 |
| 3,921,591 | 11/1975 | Mayer | 122/34 |
| 3,923,008 | 12/1975 | Beckmann | 122/34 |
| 3,937,184 | 2/1976 | Frei | 122/32 |
| 3,938,473 | 2/1976 | Mayer | 122/34 |
| 3,941,099 | 3/1976 | Michel | 122/32 |

Primary Examiner—Charles J. Myhre
Assistant Examiner—Daniel J. O'Connor
Attorney, Agent, or Firm—Marn & Jangarathis

[57] ABSTRACT

Additional waste heat recovery from a high temperature reaction effluent is effected by cooling the effluent in a shell and tube heat exchanger, having continuous tubes, with the shell being divided into two sections. In the first section, the effluent is cooled by indirect heat transfer with water at a pressure to generate medium pressure steam, and in the second section, the effluent is cooled by water which is at a pressure to generate low pressure steam or a pressure to effect preheating thereof without vaporization. Heat recovery is effected with a minimum pressure drop.

9 Claims, 3 Drawing Figures

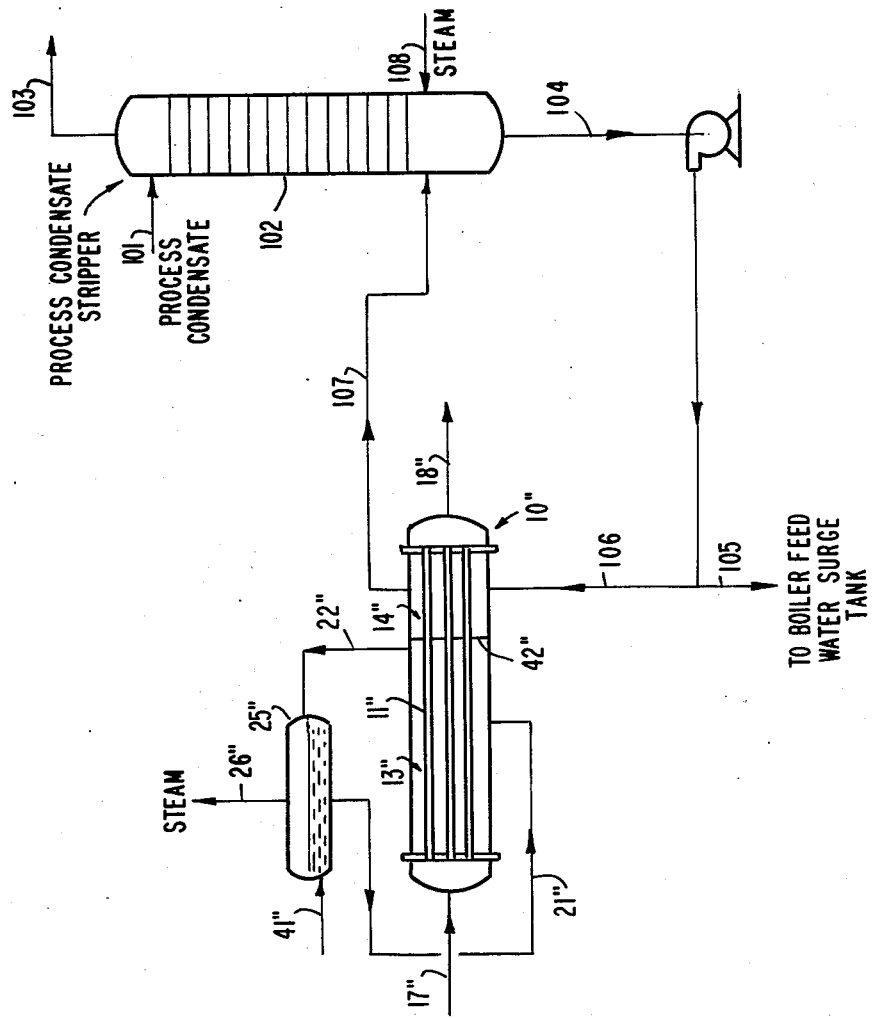
FIG. 3
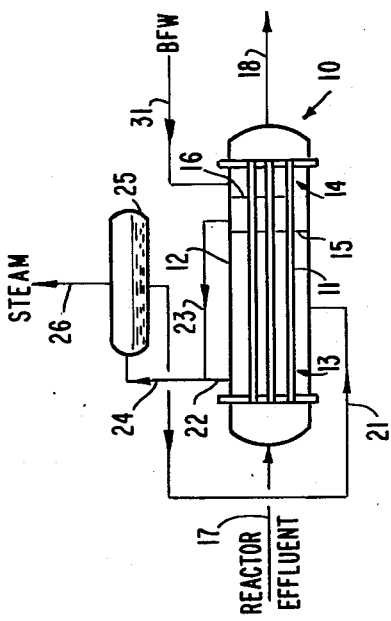
FIG. 1
FIG. 2

WASTE HEAT RECOVERY FROM HIGH TEMPERATURE REACTION EFFLUENTS

This invention relates to waste heat recovery, and more particularly to waste heat recovery from high temperature, low pressure reaction effluents.

In general, a high temperature reaction effluent is cooled in two stages, with the first stage generating medium pressure steam, and the second stage being an air cooler. The cooling effected in the air cooler represents a potential loss of heating values and, accordingly, there is a need to improve the general schemes for cooling high temperature reaction effluents in order to improve the waste heat recovery therefrom.

The principal object of the present invention is to provide for improved waste heat recovery from high temperature reaction effluents.

In accordance with the present invention, there is provided a process for cooling a high temperature reaction effluent to increase the waste heat recovery therefrom wherein the effluent is introduced into the inlet end of the tubes of a shell and tube heat exchanger wherein the shell is divided into first and second separate sections, with the first section being at the inlet end of the exchanger and the second section at the outlet end of the exchanger and wherein each tube is continuous and extends through the first and second sections. A first stream of water is passed through the first section of the shell in an indirect heat transfer relationship with the effluent in the tubes to cool the effluent and heat the first stream of water, with the first stream of water being at a pressure to generate medium pressure steam therefrom as a result of the heating in the first section. A second stream of water is passed through the second section of the shell in an indirect heat transfer relationship with the effluent in the tubes to further cool the effluent and heat the second stream of water. In this manner, improved waste heat recovery is effected by cooling the reaction effluent to a lower temperature, prior to introduction thereof into an air cooler, if required, and such a result is effectively achieved by the use of a single heat exchanger at low tube side pressure decreases.

In accordance with one embodiment of the present invention, the second stream of water which is passed through the second section is at the same pressure as the first stream of water, with the second stream of water, subsequent to heating thereof in the second section, being introduced into the first section for generating steam therefrom.

In accordance with another embodiment of the present invention, the second stream is at a pressure lower than the pressure of the first stream, with the second stream being at a pressure to generate steam therefrom as a result of the heating in the second section.

In accordance with a further embodiment, the second stream of water which is passed through the second section of the heat exchanger is obtained from the bottoms of a condensate stripper, with the second stream, subsequent to heating thereof, being introduced into the condensate stripper to provide at least a portion of the reboil requirements therefor.

The high temperature reaction effluents which are treated in accordance with the present invention may be obtained from any one of a wide variety of high temperature low pressure (no greater than 30 psig) processes. As representative examples of such processes, there may be mentioned: dehydrogenation processes, such as for the production of styrene, ethylene, propylene, butylenes, butadiene, pentenes, etc; dehydration processes, such as acetone from isopropyl alcohol, acetic anhydride from acetic acid, etc; oxidation processes, such as formaldehyde from methanol, maleic anhydride from benzene, phthalic anhydride from xylene or naphthalene, etc; and the like.

In general, the reaction effluent which is introduced into the heat exchanger is at a temperature of at least about 500° F, generally in the order from about 600° F to about 2000° F. The pressure of the effluent is generally no greater than about 30 psig in that the present invention is particularly applicable to waste heat recovery from low pressure reaction effluents. As a result of the waste heat recovery effected in the heat exchanger, in accordance with the invention, the effluent withdrawn from the heat exchanger is at a temperature in the order of from about 200° F to about 300° F.

In accordance with the present invention, the water stream employed in the first section of the heat exchanger to generate medium pressure steam is at a pressure of from about 80 psig to about 500 psig, and preferably from about 120 psig to about 200 psig. In the embodiment of the present invention wherein low pressure steam is generated in the second section of the heat exchanger, the second stream of water is at a pressure in the order of from about 15 psig to about 50 psig, and preferably from about 20 psig to about 30 psig.

The invention will be further described with respect to embodiments thereof illustrated in the accompanying drawings, wherein:

FIG. 1 is a simplified schematic flow diagram of an embodiment of the present invention;

FIG. 2 is a simplified schematic flow diagram of another embodiment of the present invention; and FIG. 3 is a simplified schematic flow diagram of a further embodiment of the present invention.

Referring to FIG. 1 of the drawings, there is shown a shell and tube heat exchanger, generally designated as 10, having a plurality of tubes 11 in a heat exchanger shell 12. The heat exchanger shell 12 is divided into a first section 13 and a second section 14 by a baffle 15, with the section 14 being further provided with a flow directing baffle 16 in order to provide for countercurrent flow of the heat transfer liquid introduced into the section 16. It should be understood that the baffle 16 could be omitted.

The tubes 11 extend continuously through the first and second shell sections 13 and 14.

A high temperature reaction effluent in line 17 is introduced into the inlet end of the heat exchanger 10 and passed through the tubes 11 in an indirect heat transfer relationship with the heat transfer liquid introduced into sections 13 and 14, as hereinafter described. The cooled effluent is withdrawn from heat exchanger 10 through line 18 for further processing.

An aqueous stream in line 21 is introduced into section 13 of the exchanger 10 wherein the aqueous stream is heated by indirect heat transfer with the effluent in the tubes. The aqueous stream in line 21 is at a temperature and pressure whereby heating thereof in section 13 is effective to generate steam therefrom. As hereinabove noted, the stream in line 21 is at a pressure in the order of from about 80 to about 500 psig, whereby medium pressure steam is generated in section 13. A steam containing stream is withdrawn from shell section 13 through line 22, combined with heated water in line 23, as hereinafter described, and the combined stream in line 24 introduced into a separation vessel 25 to separate steam from water. The medium pressure steam is withdrawn from vessel 25 through line 26. The water is withdrawn from vessel 25 through line 21 for introduction into the shell section 13.

A feed water stream in line 31 is introduced into shell section 14 wherein the water is passed in a countercurrent indirect heat transfer relationship with the effluent passing through the tubes 11 to thereby heat the aqueous stream. The aqueous stream is introduced into section 14 at a pressure essentially identical to the pressure of the water in line 21, whereby the section 14 functions to pre-heat feed water for the steam generation in section 13. The heated water stream is withdrawn from section 14 through line 23 for introduction into the separation vessel 25, as hereinabove described. It is to be understood, however, that the heated water withdrawn from section 14 of heat exchanger 10 can be introduced into section 13 in a manner other than as particularly described. Thus, for example, the aqueous stream heated in section 14 can be directly introduced into section 13.

As a result of the fact that the aqueous streams introduced into sections 13 and 14 are at essentially identical pressures, the baffle sheet 15 which separates sections 13 and 14 is sufficient in that there will be very little water leak between the sections as a result of the essentially identical pressures.

Referring now to FIG. 2 wherein like parts are designated by like prime numerals, there is shown another embodiment of the present invention wherein shell section 14' is employed for the purpose of generating low pressure steam, rather than for the purpose of preheating feed water for the generation of medium pressure steam in section 13+. In the embodiment of FIG. 2, section 13' operates as in the embodiment of FIG. 1 to generate medium pressure steam, with the boiler feed water being introduced into separation tank 25' through line 41. In the embodiment of FIG. 2, the shell section 14' is operated at a pressure lower than the shell section 13' in order to generate low pressure steam. As a result, the shell sections 13' and 14' are separated by a tube sheet, rather than a simple baffle, with the tubes being rolled tight into the tube sheet. If there is a minor leakage because of the pressure difference between the sections, there will be no adverse effect in the fluid introduced into sections 13' and 14' are both condensate or boiler feed water.

In accordance with the embodiment of FIG. 2, boiler feed water, in line 51, is introduced into a separation tank 52, with water being withdrawn from the separation tank 52 through line 53 and introduced into the shell section 14', wherein the water is heated by indirect heat transfer with the reaction effluent passing through tubes 11'. The water introduced through line 53 is at a temperature and pressure whereby heating in section 14' will result in generation of steam therefrom. As hereinabove noted, the water is generally introduced at a pressure in the order of from about 15 psig to about 50 psig. A steam containing stream is withdrawn from section 14' through line 54 and introduced into the separation vessel 52, with low pressure steam being withdrawn from separation vessel 52 through line 55.

Referring now to FIG. 3, wherein like parts are designated by like double prime numerals, there is illustrated a further embodiment of the present invention wherein section 14" of the heat exchanger 10" is employed for meeting a portion of the reboiler requirements for a stripping operation. Section 13" of the heat exchanger 10" is employed for generating medium pressure steam, as hereinabove described with respect to the embodiment of FIG. 2.

Referring now to FIG. 3, an aqueous stream, in line 101, is introduced into a stripper, schematically indicated as 102 to effect stripping of impurities therefrom. Thus, for example, the stream in 101 may be a condensate recovered from the processing operation which is contaminated with oil, and is introduced into the stripper 102 for the purpose of stripping the oil therefrom.

An overhead stream, containing the impurity, is withdrawn from the stripper 102 through line 103.

A water bottoms, essentially free of the impurity, is withdrawn from the stripper 102 through line 104, and a portion thereof withdrawn as a net stream through line 105. The water stream in line 105 can be employed as feed water to a boiler. The remaining portion of the stream in line 106 is introduced into section 14" of the heat exchanger 10" wherein the stream is heated by indirect heat transfer with the effluent in the tubes 11". The heated stream is withdrawn from section 14" through line 107 and introduced into the bottom of the stripper 102 to meet at least a portion of the heating requirements therefor. Any further heating requirements for the stripper 102 may be provided, for example, by introduction of steam, in line 108, into the bottom of the stripper 102.

In accordance with this embodiment, waste heat recovery is employed to provide medium pressure steam as well as reboiler requirements for a stripping operation. The condensate employed in line 101 is generally recovered from the reaction effluent in line 18", although the condensate may be obtained from other sources.

The present invention is particularly applicable to the waste heat recovery from an effluent from an ethyl benzene dehydrogenation reactor for the production of styrene, with the embodiments of FIGS. 1 and 3 being particularly applicable to such a process. In accordance with such a preferred embodiment, the reaction effluent introduced into the heat exchanger is generally at a temperature in the order of from about 1100° F to about 1000° F, and is withdrawn from the heat exchanger at a temperature in the order of from about 200° F to about 300° F. The styrene effluent also contains a high amount of water and, accordingly, the embodiment of FIG. 3 may be employed for treating the condensate recovered from the styrene effluent to thereby remove organic impurities from such condensate.

It is to be understood that the invention may be practiced other than as described with respect to the preferred embodiments. Thus, for example, the heat exchanger can be divided into more than two shell sections, although two sections are preferred. This modification and others should be apparent to those skilled in the art from the teachings herein.

The present invention is particularly advantageous in that additional waste heat recovery can be obtained from a high temperature reaction effluent. The use of a single heat exchanger with separate shell sections, as hereinabove described, offers the advantage over a two heat exchanger structure in that a two heat exchanger system would require a second exchanger having a number of tubes less than the tubes in the first exchanger, which would result in an increase in pressure drop and a corresponding increase in the operating pressure of the reactor providing the effluent. As a result, by proceeding in accordance with the present invention, additional waste heat recovery is effected, without the necessity of increasing pressure drop in order to effect such recovery. Thus, in accordance with the present invention, the waste heat recovery can be effected with a pressure drop across the tube side of the exchanger of less than 10 psi, and preferably less than 3 psi. Additional waste heat recovery at low pressure drop is advantageous in that the heat recovery is effected without an adverse increase in the reactor pressure in which the effluent is produced.

Numerous modifications and variations of the present invention are possible in light of the above teachings and, therefore, within the scope of the appended claims, the invention may be practiced otherwise than as particularly described.

What is claimed is:

1. A process for cooling a high temperature reaction effluent to increase heat recovery therefrom, comprising:

introducing the effluent at a temperature of from about 600° F to about 2000° F into the inlet end of the tubes of a shell and tube heat exchanger, said heat exchanger shell being divided into first and second completely separate and distinct sections, said first section being at the inlet end of the exchanger whereby the effluent is introduced into the portion of the tubes in the first section and the second section being at the outlet end of the exchanger whereby the effluent is withdrawn from the portion of the tubes in the second section, each tube being a continuous tube which extends through the first and second section;

introducing and passing a first stream of water through the first section of the shell in an indirect heat transfer relationship with the effluent in the tubes to cool said effluent and heat said first stream of water; said first stream of water being at a pressure to generate steam therefrom as a result of said heating in the first section, said first stream being at a pressure of from about 80 to about 500 psig;

introducing and passing a second stream of water through the second section of the shell in an indirect heat transfer relationship with effluent in the tubes to further cool said effluent and heat said second stream of water;

withdrawing said second stream of water from the heat exchanger and re-introducing said withdrawn second stream into the heat exchanger in said first stream; and withdrawing cooled effluent from the outlet end of said tubes, said cooled effluent being at a temperature of from about 200° F to about 300° F.

2. The process of claim 1 wherein the effluent introduced into the inlet end of the tubes is at a pressure of no greater than 30 psig and the pressure reduction from the inlet end of the tubes to the outlet end of the tubes is no greater than 10 psi.

3. The process of claim 1 wherein the first and second streams are at a pressure of from about 120 to about 200 psig.

4. The process of claim 3 wherein the effluent is recovered from a reactor producing styrene and is at a temperature of from about 1000° F to about 1100° F.

5. A process for cooling a high temperature reaction effluent to increase heat recovery therefrom, comprising:

introducing the effluent at a temperature of from about 600° F to about 2000° F into the inlet end of the tubes of a shell and tube heat exchanger, said heat exchanger shell being divided into first and second completely separate and distinct sections, said first section being at the inlet end of the exchanger whereby the effluent is introduced into the portion of the tubes in the first section and the second section being at the outlet end of the exchanger whereby the effluent is withdrawn from the portion of the tubes in the second section, each tube being a continuous tube which extends through the first and second section;

introducing and passing a first stream of water through the first section of the shell in an indirect heat transfer relationship with the effluent in the tubes to cool said effluent and heat said first stream of water; said first stream of water being at a pressure to generate stream therefrom as a result of said heatin in the first section, said first stream being at a pressure of from about 80 to about 500 psig;

introducing and passing a second stream of water through the second section of the shell in an indirect heat transfer relationship with the effluent in the tubes to further cool said effluent and heat said second stream of water, said second stream of water being at a pressure of from about 15 to about 50 psig to produce steam therefrom;

withdrawing steam produced in the second section from said heat exchanger; and withdrawing cooled effluent from the outlet end of said tubes, said cooled effluent being at a temperature of from about 200° F to about 300° F.

6. The process of claim 5 wherein the effluent introduced into the inlet end of the tubes is at a pressure of no greater than 30 psig and the pressure reduction from the inlet end of the tubes to the outlet end of the tubes is no greater than 10 psi.

7. The process of claim 6 wherein the effluent is recovered from a reactor producing styrene and is at a temperature of from about 1000° F to about 1100° F.

8. A process for cooling a high temperature reaction effluent to increase heat recovery therefrom, comprising:

introducing the effluent at a temperature of from about 600° F to about 2000° F into the inlet end of the tubes of a shell and tube heat exchanger, said heat exchanger shell being divided into first and second completely separate and distinct sections, said first section being at the inlet end of the exchanger whereby the effluent is introduced into the portion of the tubes in the first section and the second section being at the outlet end of the exchanger whereby the effluent is withdrawn from the portion of the tubes in the second section, each tube being a continuous tube which extends through the first and second section;

introducing and passing a first stream of water through the first section of the shell in an indirect heat transfer relationship with the effluent in the tubes to cool said effluent and heat said first stream of water; said first stream of water being at a pressure to generate steam therefrom as a result of said heating in the first section, said first stream being at a pressure of from about 80 to about 500 psig;

introducing and passing a second stream of water obtained from the bottom of a condensate stripper through the second section of the shell in an indirect heat transfer relationship with the effluent in the tubes to further cool said effluent and heat said second stream of water;

withdrawing a heated stream from the second section of the heat exchanger and introducing said heated stream into the condensate stripper to provide at least a portion of the heat requirements therefor; and withdrawing cooled effluent from the outlet end of said tubes; said cooled effluent being at a temperature of from about 200° F to about 300° F.

9. The process of claim 8 wherein the effluent introduced into the inlet end of the tubes is at a pressure of no greater than 30 psig and the pressure reduction from the inlet end of the tubes to the outlet end of the tubes is no greater than 10 psi.

* * * * *